United States Patent
Roig Borrell

(10) Patent No.: US 9,339,819 B2
(45) Date of Patent: May 17, 2016

(54) CONDITIONING/MOISTURIZING DEVICE FOR PROCESSING ALMOND KERNELS

(75) Inventor: José Vicente Roig Borrell, Dénia (ES)

(73) Assignee: JOSE BORRELL S.A. (ES)

( * ) Notice: Subject to any disclaimer, the term of this patent is extended or adjusted under 35 U.S.C. 154(b) by 591 days.

(21) Appl. No.: 13/516,844

(22) PCT Filed: Dec. 18, 2009

(86) PCT No.: PCT/ES2009/000578
§ 371 (c)(1),
(2), (4) Date: Oct. 4, 2012

(87) PCT Pub. No.: WO2011/073454
PCT Pub. Date: Jun. 23, 2011

(65) Prior Publication Data
US 2013/0014651 A1    Jan. 17, 2013

(51) Int. Cl.
*A01J 11/00* (2006.01)
*C12C 7/06* (2006.01)
(Continued)

(52) U.S. Cl.
CPC ... *B02B 1/08* (2013.01); *A23B 9/02* (2013.01); *A23L 1/2123* (2013.01); *A23N 12/04* (2013.01)

(58) Field of Classification Search
CPC .... A21C 13/00; A23L 3/3418; A23L 1/2123; A23B 7/152; A23B 7/148; A23B 4/052; A23B 9/02; B02B 1/08; A23N 12/04; C12C 7/22; C12C 7/24; C12C 7/042; C12C 7/163; C12C 13/02
USPC ....... 99/348, 355, 404, 409, 443 C, 470, 517, 99/278, 485, 487, 488, 616, 518, 519, 524, 99/537, 538, 539, 540, 568, 570, 574, 600, 99/608, 609, 617, 473, 474, 475, 477, 478, 99/479; 426/44, 45, 46, 288, 523, 618, 426/632
See application file for complete search history.

(56) References Cited

U.S. PATENT DOCUMENTS 1,353,209 A * 9/1920 Barkis, Sr. ............. A23B 7/144
                                                          99/427
3,175,596 A * 3/1965 Raye .............................. 99/470
(Continued)

FOREIGN PATENT DOCUMENTS

ES    1015212 U    6/1991
ES    2048316 T3   3/1994
(Continued)

OTHER PUBLICATIONS

International Search Report Application No. PCT/ES2009/000578 Completed: Sep. 14, 2010; Mailing Date: Sep. 16, 2010 5 pages.

*Primary Examiner* — David Angwin
*Assistant Examiner* — Gyounghyun Bae
(74) *Attorney, Agent, or Firm* — St Onge Steward Johston and Reens LLC

(57) ABSTRACT

The invention relates to a conditioning/moisturizing device for almond grains, especially designed to provide the grains of the fruit with the elasticity required in order to cut the grain into flakes, sticks, cubes or other configurations, with minimum loss through production of flour and others. The device essentially comprises an elongate body, with a generally cylindrical shape and tilted position, which includes on the inside thereof a means for sweeping the almond, made up of a spindle which sweeps the fruit in an upward direction in a steam-saturated environment with controlled temperature, for which purpose the cylindrical body comprises a plurality of steam injection nozzles, said steam being distributed externally and fed to said nozzles from an external steam distributor. The device includes temperature and steam sensors whose measurements are suitable for regulating the rotating speed of the spindle in order to adjust the time during which the almond remains in the environment inside the body.

15 Claims, 1 Drawing Sheet

(51) Int. Cl.
  *B02C 25/00*    (2006.01)
  *A23B 4/00*     (2006.01)
  *A23G 1/02*     (2006.01)
  *B02B 1/08*     (2006.01)
  *A23B 9/02*     (2006.01)
  *A23L 1/212*    (2006.01)
  *A23N 12/04*    (2006.01)

(56) References Cited

U.S. PATENT DOCUMENTS

| | | | | |
|---|---|---|---|---|
| 3,176,606 A | * | 4/1965 | Zoffmann | 99/278 |
| 3,293,771 A | * | 12/1966 | Lawrence et al. | 34/592 |
| 3,294,549 A | * | 12/1966 | Vix et al. | 426/632 |
| 4,248,141 A | * | 2/1981 | Miller, Jr. | 99/483 |
| 4,537,122 A | * | 8/1985 | George | 99/516 |
| 4,569,850 A | * | 2/1986 | Harris | A22C 25/02 |
| | | | | 426/482 |
| 4,773,323 A | * | 9/1988 | Frasch | A23N 5/00 |
| | | | | 99/569 |
| 4,829,892 A | * | 5/1989 | Brown et al. | 99/475 |
| 4,993,316 A | * | 2/1991 | Greer | 99/487 |
| 5,376,798 A | * | 12/1994 | Pettit | 250/370.14 |
| 6,284,300 B1 | * | 9/2001 | Prendiville et al. | 426/483 |
| 6,431,061 B2 | * | 8/2002 | Suter | 99/625 |
| 6,487,962 B1 | * | 12/2002 | Horn | 99/330 |
| 6,861,083 B2 | * | 3/2005 | Martel | A23D 9/00 |
| | | | | 426/481 |
| 6,926,863 B1 | | 8/2005 | Goeldner | |
| 7,856,737 B2 | * | 12/2010 | McMahon et al. | 34/511 |
| 8,707,861 B2 | * | 4/2014 | Gunawardena | A23B 4/0053 |
| | | | | 422/26 |
| 2006/0040029 A1 | * | 2/2006 | Gunawardena et al. | 426/521 |
| 2007/0196559 A1 | * | 8/2007 | Fukumori et al. | 426/618 |
| 2008/0089987 A1 | * | 4/2008 | Horn | A23C 19/0684 |
| | | | | 426/510 |
| 2008/0220138 A1 | * | 9/2008 | Dallagnol et al. | 426/523 |

FOREIGN PATENT DOCUMENTS

| | | |
|---|---|---|
| ES | 2199816 T3 | 3/2004 |
| ES | 2323641 T3 | 7/2009 |
| GB | 543720 A | 3/1942 |
| JP | H01242154 A | 9/1989 |
| WO | 2007047136 A1 | 4/2007 |

* cited by examiner

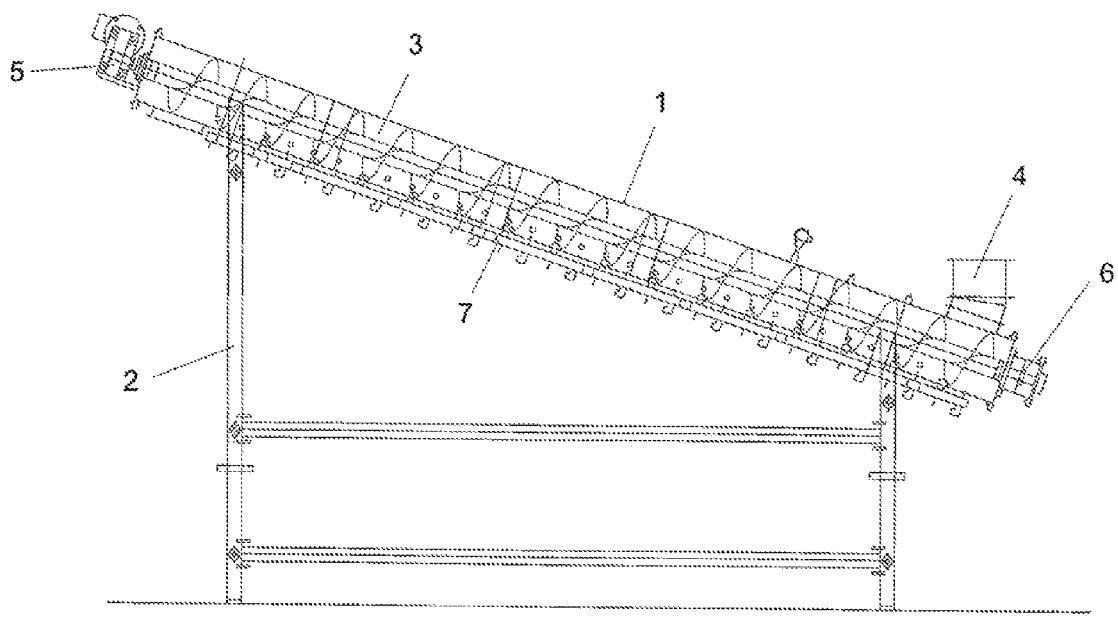

CONDITIONING/MOISTURIZING DEVICE FOR PROCESSING ALMOND KERNELS

CROSS REFERENCE TO RELATED APPLICATION

This application claims the benefit under 35 USC 119 and/or 365 of International Application No. PCT/ES2009/000578 filed on Dec. 18, 2009 titled "CONDITIONING/MOISTURIZING DEVICE FOR PROCESSING ALMOND KERNELS". The contents of the above-identified Application is relied upon and incorporated herein by reference in its entirety.

OBJECT OF THE INVENTION

The present invention relates to a conditioning/moisturizing device for processing almond kernels, which provides essential novel features and considerable advantages with respect to the means known and used for the same purpose in the current state of the art.

More particularly, the invention develops a device the object of which is the action of making the almond elastic, i.e., providing it with the elasticity necessary for its subsequent processing in furtherance of producing flakes, sticks, cubes or fragments of another type into which the almond can be cut or split, for the subsequent incorporation thereof into other elaborated products, such that minimum waste or loss through producing almond flours which occur during the sectioning or cutting operation is assured. The device of the invention is designed such that it allows applying on the almond, which is blanched or natural, whichever is appropriate, a controlled amount of steam, keeping the temperature below a pre-established limit, for which purpose the device has been provided with a generally cylindrical body with a predefined length, provided with multiple steam inlets said steam being generated externally with internal longitudinal sweeping means causing complete exposure of the almond to a steam-saturated environment, which results in the product quickly becoming elastic. The device includes humidity and temperature control sensors and control means for controlling the product sweeping speed according to the degree of humidity of the product at the entrance and the desired degree of humidity of the product at the exit.

The field of application of the invention is comprised in the industrial sector dedicated to manufacturing machines and devices for processing almonds and other nuts and dried fruits.

BACKGROUND AND SUMMARY OF THE INVENTION

Persons skilled in the art know of the various operations to which almond kernels and other nuts and dried fruits are subjected during their processing phase. In the specific case of almonds, once they have been shelled they are presented to the consumer in various manners. On one hand, natural kernel results from breaking the outer shell (endocarp), said kernel consisting of a seed bearing the outer husk or skin. If this husk is extracted, both the kernel obtained and the process for separating the skin are commonly known as "blanched kernel" or "blanching". Once this blanched kernel is obtained, it can now be subjected to fragmenting operations to obtain sections in the form of flakes, sticks, cubes, etc., together with quite a significant amount of flour.

To blanch kernels today, they are previously immersed for a certain time in a warm water bath such that the husk softens and can then be removed. The drawback of this process is that a considerable amount of humidity is added to the kernel, with all the problems that water activity produces in foods, such that it is necessary to reduce that humidity immediately with the help of dryers and to then cool the kernel for storage.

However, when almonds have to be processed to obtain flakes, sticks, cubes, etc., if this operation is done on blanched kernels with a degree of humidity of 3 or 4%, considerable waste (flour production) is inevitably produced, in addition to having rather poor quality. This is because the kernel has to be elastic (or flexible) to easily cut it, so it is clear that temperature and humidity parameters must be controlled, all this depending on various factors. In processes used today, these control operations are performed by means of a continuous monitoring system, so there has to be an operator who is dedicated exclusively to feeding the machine.

Processors today have to divert part of the production of blanched kernels for industrialization, leaving them with a higher percentage of humidity, then they are passed through a machine known as an "elasticizer", where the blanched kernels are heated with the help of gas burners, such that with the action of the heat the kernels become softer, making them easier to cut. This process has drawbacks because, firstly, blanching must be regulated to obtain an almond with humidity, which is difficult to control, and secondly, the almonds must be processed rather quickly to prevent them from spoiling, which is rather impractical; blanched almonds for cutting cannot be purchased, nor can they be blanched and industrialized at the same time.

The most common manner of working is therefore making flakes and sticks with blanched almonds with little humidity, which almonds are heated with the elasticizer, but the results are not, as stated, very satisfactory. Furthermore, a new market demanding natural kernel flakes, and therefore dry kernel, the elaboration of which is barely profitable with current systems due to the high percentage of waste (flour) that is produced, has recently come about.

Taking into account the drawbacks of the current art mentioned briefly above, the main objective of the present invention is the development of an elasticizing device for almonds and the like, whereby providing effective solutions to the problems associated with waste and loss in current processes. This objective has been fully met by means of the device that will be described below, the essential features of which are described in the characterizing part of the attached claim 1.

Essentially, the elasticizing device proposed by the invention is typically based on thorough control of the humidity acting on the almond object of treatment, for which purpose the device consists of an elongated body or casing with a generally cylindrical shape, the inside of which houses sweeping means for sweeping the product preferably consisting of a spindle (or worm screw), extended longitudinally, axially coinciding with the axis of the device. The body has a plurality of steam inlet nozzles through which steam is supplied, said steam coming from an external generator, into the inner space of the body of the device, the process being controlled with respect to temperature and degree of humidity inside by means of suitable sensors. The device further comprises elements for regulating the rotating speed of the product sweep spindle, depending on both the mentioned parameters of humidity and temperature, so that the dwell time of the product as it is moving inside the body of the device is only the time necessary to provide the almond with the right amount of humidity for correct elasticizing thereof, and to also reduce the need for subsequent drying with the subsequent energy savings this entails.

The device of the invention therefore allows assuring satisfactory results in terms of elasticizing the almond, favorably solving the problems affecting devices and machines of the current art, as mentioned above. The processing operations for processing the product are further simplified, with the subsequent economic savings this entails in terms of production expenses.

BRIEF DESCRIPTION OF THE DRAWINGS

These and other features and advantages of the invention will become clearer from the following detailed description of a preferred embodiment thereof given only by way of non-limiting example in reference to the attached drawings in which:

FIG. 1 is a general schematic side elevational view of a conditioning/moisturizing device for elasticizing almonds, according to the invention.

DESCRIPTION OF A PREFERRED EMBODIMENT

As mentioned above, the detailed description of the conditioning and moisturizing device for elasticizing the fruit of almonds will be provided below with the aid of the attached drawings, the sole FIGURE of which uses reference numbers to designate the different parts making it up. Therefore, in relation to said FIG. 1, a schematic representation of a side elevational view of a hydrating device for fruits such as almonds can be seen, whereby said fruits are provided, as stated, with elasticity features that allow them to be cut or fractioned in different forms: flakes, sticks, cubes, or other configurations. The device is structured based on an elongated body, pointed out with reference number 1, with a generally cylindrical shape, in turn functioning as an internally hollow external casing, supported by a lower metal frame 2 in a tilted position with respect to the horizontal. A spindle 3 extended longitudinally in a position coinciding with the axis of the cylinder is housed inside the cylinder 1, said spindle being driven to rotate by means of a motor 6 equipped with speed regulating means, which spindle 3 is provided to sweep the almond in an upward direction from a supply hopper 4 located at the lowest end of the cylindrical body 1, to a collecting device 5 located in a position corresponding with the upper end of said cylindrical body 1. A plurality of steam nozzles are arranged along a generatrix of the body of the cylinder, fed from a steam distributor 7 extending longitudinally near the cylindrical body 1 and parallel to same, the latter being connected to an external steam generator (not depicted). The device further includes conventional humidity and temperature sensors, not seen in the FIGURE, in contact with the environment inside the body to measure at all times both the temperature value and the degree of humidity.

According to the foregoing, a steam-saturated environment is created inside the cylindrical body 1 which allows, as stated, the almonds to acquire the right amount of humidity for correctly elasticizing them. This parameter, together with suitable temperature control in furtherance of keeping it below approximately 60° C. to prevent unwanted scalding thereof, determines the changes in rotating speed of the spindle 3 to obtain an exposure time of the almonds to steam that is the most suitable for the purposes sought. Furthermore, keeping the almond in the mentioned environmental conditions allows achieving other additional advantages, such as obtaining a cleaner environment than when hot water is used with a subsequent saving in water consumption, also saving energy and further allowing self-cleaning of the machine.

The almonds thus elasticized with just the "right" humidity content for the sought fragmenting or cutting purposes, need much less drying time than in traditional processes, which, as stated, also results in considerable energy saving.

It is not considered necessary to extend the content of the present description so that a person skilled in the art can understand its scope and the advantages derived from it, as well as to carry out the practical embodiment of its object.

Notwithstanding the foregoing, and given that the description provided corresponds to only one preferred embodiment, it will be understood that it is possible to introduce, within the essential nature of the invention, multiple modifications and variations to detail, which will likewise be comprised within the scope of the invention, and these modifications and variations may particularly affect features such as the shape, size or the manufacturing materials, or any other modifications and variations can be introduced that do not alter the invention as it has been described and defined in the following claims.

What is claimed is:

1. A moisturizing device for processing almonds to provide the almonds with suitable elasticity for fragmenting of the almonds comprising:
   an elongated body in a tilted position with respect to horizontal, the elongated body having a cylindrical shape;
   a metal frame supporting said elongated body in the tilted position;
   a hopper positioned at a lower end of the elongated body configured to receive almonds;
   a collector positioned at an upper end of the elongated body;
   an internal spindle coinciding with an axis of said elongated body, said internal spindle when rotated moving the almonds from said hopper towards said collector;
   a steam distributor extending longitudinally near the cylindrical body and connected to a steam generator;
   a plurality of steam injection nozzles aligned along said elongated body and injecting steam into said elongated body such that the steam is injected into an environment inside said elongated body and surrounding said internal spindle, the steam increasing a moisture content of the almonds;
   a temperature sensor and a humidity sensor measuring a temperature and a humidity inside the environment;
   a motor adapted to rotate the internal spindle such that a speed of rotation of the motor is regulated by a speed regulator based on the temperature and humidity inside the environment wherein the speed of rotation of the motor determines the speed at which the almonds move from said hopper to said collector such that a dwell time of the almonds as they move from said hopper to said collector provides the almonds with enough humidity for elasticizing thereof.

2. The device according to claim 1 further comprising said elongated body is a cylinder and said plurality of steam injection nozzles aligned according to a generatrix of said cylinder.

3. The device according to claim 2, further comprising a motor connected to the internal spindle, the motor adapted to rotate the internal spindle.

4. The device according to claim 3 wherein the motor is adapted to vary a rotation speed of the spindle.

5. The device according to claim 1 wherein a speed of said almonds traveling within said elongated body is varied by the internal spindle such that each almond is exposed to the steam according to a dwell time based on the internal temperature and humidity within said elongated body.

6. The device according to claim 1 wherein the environment is maintained below 60° C. and in a steam saturation state.

7. A method of increasing a moisture content in almonds, the method comprising:
- receiving a plurality of almonds in a hopper wherein the plurality of almonds are in dry kernel form;
- feeding the plurality of almonds from the hopper and into an elongated body, the elongated body having a cylindrical shape and extending upwards at an angle;
- introducing steam into an environment inside the elongated body to saturate the environment with the steam;
- measuring a temperature and a humidity in the environment;
- conveying the almonds from a lower end of the elongated body and towards an upper end of the elongated body by rotating an internal spindle with a motor such that the internal spindle rotates at a speed such that the almonds are exposed to the steam for a time period in order to increase a moisture content of the almonds as the almonds move from the lower end to the upper end wherein a rotation speed of the motor is regulated based on the measured humidity and temperature and wherein regulating the rotation speed of the motor determines the speed at which the almonds move from the lower end and to the upper end such that a dwell time of the almonds as they move from the lower end to the upper end provides the almonds with enough humidity for elasticizing thereof;
- collecting the almonds at the upper end with a collector.

8. The device according to claim 7 wherein the environment is maintained below 60° C.

9. The device according to claim 7 wherein said steam is introduced via a plurality of steam injection nozzles aligned according to a generatrix of said elongated body.

10. The device according to claim 7 varying the speed via a motor connected to the internal spindle.

11. The device according to claim 7 further comprising:
- adjusting the rotation speed based on the internal temperature and the humidity so that the almonds have a predetermined moisture content upon reaching the upper end.

12. The device according to claim 7 further comprising:
- varying a speed of said almonds traveling within said elongated body such that each almond is exposed to the steam according to a dwell time based on an internal temperature and humidity within said elongated body.

13. A moisturizing device for processing almonds to provide the almonds with suitable elasticity for fragmenting of the almonds comprising:
- an elongated body in a tilted position with respect to horizontal, the elongated body having a cylindrical shape;
- a metal frame supporting said elongated body in the tilted position;
- a hopper positioned at a lower end of the elongated body configured to receive almonds;
- a collector positioned at an upper end of the elongated body;
- an internal spindle coinciding with an axis of said elongated body, said internal spindle when rotated moving the almonds from said hopper towards said collector;
- a plurality of steam injection nozzles aligned along said elongated body and injecting steam into said elongated body such that the steam is injected into an environment inside said elongated body and surrounding said internal spindle, the steam increasing a moisture content of the almonds;
- a temperature sensor and a humidity sensor measuring a temperature and a humidity inside the environment;
- a motor adapted to rotate the internal spindle such that a speed of rotation of the motor is regulated by a speed regulator based on the temperature and humidity inside the environment wherein the speed of rotation of the motor determines the speed at which the almonds move from said hopper to said collector such that a dwell time of the almonds as they move from said hopper to said collector provides the almonds with enough humidity for elasticizing thereof.

14. The device according to claim 13 further comprising said elongated body is a cylinder and said plurality of steam injection nozzles aligned according to a generatrix of said cylinder.

15. The device of claim 14 further comprising a steam distributor extending longitudinally near the cylindrical body and connected to a steam generator.

* * * * *